United States Patent [19]

Adams

[11] Patent Number: 4,676,335

[45] Date of Patent: Jun. 30, 1987

[54] POWER ASSISTED STEERING SYSTEM

[75] Inventor: Frederick J. Adams, Clevedon, Great Britain

[73] Assignee: TRW Cam Gears Limited, Hertfordshire, Great Britain

[21] Appl. No.: 871,518

[22] Filed: Jun. 6, 1986

[30] Foreign Application Priority Data

Jun. 10, 1985 [GB] United Kingdom ................ 8514654

[51] Int. Cl.$^4$ .............................................. B62D 5/10
[52] U.S. Cl. ..................................... 180/148; 180/132
[58] Field of Search ....................... 180/148, 132, 154; 91/416, 436, 437

[56] References Cited

U.S. PATENT DOCUMENTS

| 4,144,947 | 3/1979 | Withers et al. | 180/132 |
| 4,365,683 | 12/1982 | Adams | 180/132 |
| 4,373,599 | 2/1983 | Walter et al. | 180/148 |

Primary Examiner—John J. Love
Assistant Examiner—Donn McGiehan
Attorney, Agent, or Firm—Tarolli, Sundheim & Covell

[57] ABSTRACT

A power assisted steering system of the rack and pinion type with a "centre take-off" 7 has its rack bar 1 carrying a piston 17 at one end thereof. The rack bar 1 forms with the piston opposed pressurized faces 20 and 21 which present pressurized areas in the ratio 1:2. Valve means 22 controllable by rotational input to the pinion 4 directs fluid at the same pressure to both piston chambers 18 and 19 to assist in displacement of the piston rod 1 in a sense to contract the piston chamber 18 or directs fluid to the piston chamber 18 and exhausts the piston chamber 19 to assist in displacement of the piston rod 1 in a sense to contract the piston chamber 19—the power assistance to displacement of the piston rod being substantially the same in both senses of direction. The rack bar 1 is slidably mounted by and longitudinally displaceable relative to two bearings 10 and 11 of which bearing 10 biases the rack 5 into engagement with the pinion and the bearing 11 is in the form of a bush which partly seals an end of the piston chamber 18. The bearings 10 and 11 restrain the rack bar for lateral displacement.

7 Claims, 1 Drawing Figure

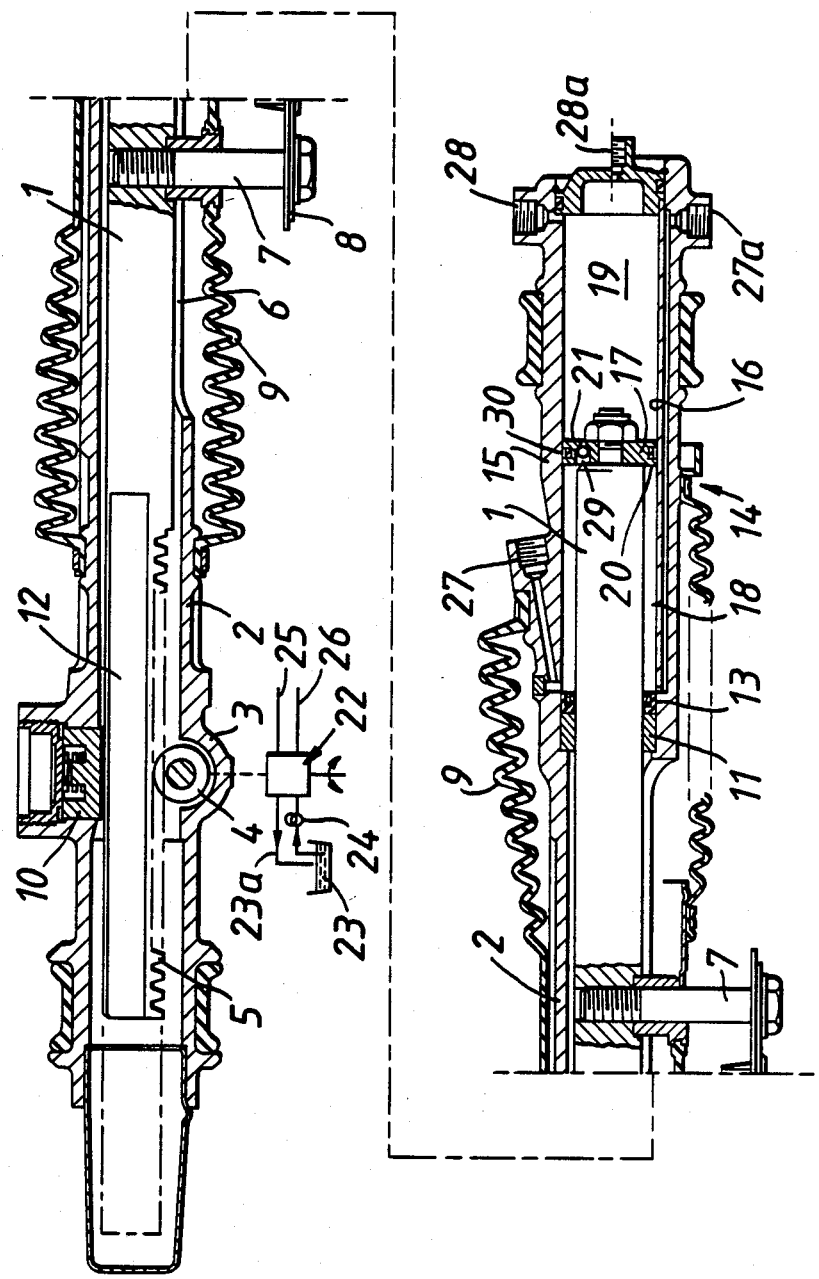

POWER ASSISTED STEERING SYSTEM

TECHNICAL FIELD AND BACKGROUND ART

This invention relates to a power assisted steering system. More particularly the invention concerns a system of the kind comprising a rack bar having a rack with which a pinion engages so that rotation of the pinion in response to a steering input effects in longitudinal displacement of the rack bar to provide a steering output and in which a piston and cylinder device is located in longitudinal alignment with the rack bar with the piston of the device connected to an end of the rack bar for displacement therewith. With such a system valve means will be provided for determining flow of fluid to the piston and cylinder device and which means is responsive to the steering input to control actuation of the piston and cylinder device and thereby provide power assistance to the displacement of the rack bar which is intended by the steering input.

Steering systems of the type aforementioned are frequently adopted where the rack bar has a so-called "centre take-off" (as disclosed, for example in G.B. Patent Specification Nos. 1,487,315 and 2,071,033A) whereby tie rods from which the steering output is derived are coupled to the rack bar for displacement therewith at a position longitudinally between the rack and the end of the rack bar which is coupled to the piston. With "centre take-off" it is conventional for the rack bar to be extended longitudinally by a piston rod through which it engages on one side the piston of the piston and cylinder device; as a result the piston is out of balance when subjected to equal pressures on its opposite faces because these longitudinally opposed faces have different effective pressurised areas caused by the piston rod area on the one side of the piston. It is therefore conventional to utilise piston rods which are considerably thinner and less robust than the rack bars from which they extend so that the difference between the opposed pressurised areas of the piston is minimised. However, such relatively thin piston rods, whilst adequately withstanding the longitudinal tension or compression to which they are subjected in assisting in the longitudinal displacement of the rack bar, are generally unsuitable for withstanding the side loads or lateral loading to which the rack bar is likely to be subjected in use—particularly from the aforementioned centre take-off. As a consequence it is conventional practice for the rack bar to be slidably displaceable in its hosing and supported by two longitudinally spaced bearings or bushes which are capable of accommodating the side loadings to which that bar will be subjected while a third bearing or bush is provided by which the piston rod os slidably supported and, in effect, a fourth bearing is provided by the sliding engagement of the piston in its cylinder. Furthermore, to accommodate for possible misalignment between the rack bar and the piston rod which may be caused by the aforementioned side loadings from the centre or end take-off or from the driving engagement between the pinion and the rack, it is conventional practice to provide a ball joint coupling between the piston rod and the end of the rack bar from which that rod extends. As a consequence it is recognised that the requirement for the several bearings and the ball joint as discussed above add significantly to the expense of manufacture and size, particularly the longitudinal extent, of the assembly.

It is an object of the present invention to provide a power assisted steering system of the kind discussed above and by which the disadvantages of the prior proposals may be alleviated. The invention therefore aims to provide an assembly of the kind discussed which lends itself to a structure with a relatively shorter longitudinal extent than comparable conventional assemblies, to a structure which has less bearings or bushes than that conventionally regarded as necessary, and to a structure which permits the rack bar to be displaced longitudinally by the piston and cylinder device under control of the valve means at substantially the same speed in both senses of direction so that the power assistance facility which is provided may be substantially the same as that which would be effected from a balanced piston.

STATEMENT OF INVENTION AND ADVANTAGES

According to the present invention there is provided a power assisted steering system comprising a rack bar having a rack; a pinion engaging with the rack and rotation of which in response to a steering input effects in longitudinal displacement of the rack bar to provide a steering output which is derived from a position on the rack bar remote from its ends; a piston and cylinder device located in longitudinal alignment with the rack bar and with the piston thereof connected to an end of the rack bar for displacement therewith; valve means determining flow of fluid for the piston and cylinder device and being responsive to the steering input to control actuation of the piston and cylinder device and power assistance to the displacement of the rack bar intended by said steering input; said piston being located on the said end of the rack bar and having longitudinally opposed faces with different effective pressurised areas of which a first face with the smaller effective area communicates with a first piston chamber through which the rack bar extends to the piston and the second face with the larger effective area communicates with a second piston chamber, said second face having an effective pressurised area which, substantially, is twice that of the first face, said valve means being arranged to direct fluid at substantially the same pressure to both said piston chambers in response to a steering input in one sense whereby the first piston chamber is contracted by the fluid pressure differential on the piston and to direct fluid under pressure to the first piston chamber and to exhaust the second piston chamber in response to a steering input in the opposite sense so that the second piston chamber is contracted by a fluid pressure differential which is substantially the same as that first mentioned; and wherein the rack bar is sliably mounted by and longitudianlly displaceable relative to bearing means which restrains said rack bar from lateral displacement, said bearing means consisting of two longitudinally spaced bearings.

By the present invention it is envisaged that part length of the rack bar, in effect, replaces the piston rod as incorporated in the conventional arrangements so that the piston is mounted on, or integrally formed with, the end of the rack bar. The greater thickness of the rack bar (as compared with a conventional piston rod) will reduce the effective pressurised area of the smaller, first face of the piston and this first face is determined by appropriately sizing the piston and its connection with the rack bar so that the effective pressurised area of the second face is substantially double that of the first face.

By having the aforementioned size relationship between the first and second pressurised faces of the piston it will be realised that when both piston chambers are subjected to the same fluid pressure, the piston may be displaced to contract the first piston chamber at a speed which is substantially the same as that at which the piston will be displaced when the second piston chamber is exhausted and the first piston chamber is subjected to the aforementioned fluid pressure. It will also be realised that to accommodate for slight variations which may exist in the two to one relationship in the areas of the opposed piston faces (which may result, for example, by working tolerances) an adjustable restrictor may be provided in the fluid conduiting for adjusting the fluid pressure to a piston chamber so that the speed of displacement of the piston will be the same in both directions.

The form of valve means for controlling fluid flow to the piston and cylinder device will be well known to persons skilled in the art and such valve means will usually have a neutral condition which it adopts when a steering input torque is not applied to the pinion and in which both piston chambers communicate with exhaust or fluid reservoir; an example of a suitable form of rotary valve means is discussed in our G.B. Patent Specification No. 2,075,932B.

A particular advantage of the present invention is that the location of the piston on the rack bar avoids the necessity of incorporating a ball joint between the rack bar and the piston so that the overall longitudinal extent of the assembly can be reduced in comparison with conventional steering systems of the kind previously discussed where a ball joint is provided between the rack bar and a piston rod.

In accordance with conventional practice the rack bar of the present invention will be longitudinally displaceable through bearings or bushes which provide lateral support for the rack bar; however the present invention is restricted to two such bearings or bushes which are longitudinally spaced on the rack bar and mounted in a housing to be restrained against longitudinal displacement relative thereto. It has been found that, because of the rigid and robust structure of the rack bar, two bearings as aforementioned are quite adequate to restrain the rack bar from lateral displacement even though the rack bar extends to the piston. Preferably the rack bar, other than for a part length thereof which is substantially co-extensive with the rack, is of substantially constant cylindrical form (it will be appreciated that this cylindrical form may be locally disrupted, for example to permit engagement of the "centre take-off" or in the attachment of the piston thereto). One of the two bearings may be in the form of a yoke or support located on the side of the rack bar oppositely to the region of engagement between the rack and the pinion - usually to urge the teeth of these latter components into engagement. One or the second of the two bearings is preferably in the form of a bush located to form part of the piston and cylinder device whereby it seals an end of the first piston chamber. Usually the piston will be provided with a peripheral seal which may serve to form a bearing that is slidable with the rack bar and provide additional support to alleviate lateral displacement of the rack bar. From the aforegoing it will be appreciated that the robust nature of the rack bar in extending to carry the piston avoids the necessity of having an additional bearing or bush which is conventionally provided for, and through which, the piston rod is slidable between the ball joint and the piston—this permits an appreciable reduction in material and manufacturing costs.

DRAWING

One embodiment of a power assisted steering system constructed in accordance with the present invention will now be described, by way of example only, with reference to the accompanying illustrative drawing of the system which predominantly shows a longitudinal section through a rack and pinion assembly having a centre take-off.

DETAILED DESCRIPTION OF DRAWING

The steering system has a rack bar 1 which is longitudinally displaceable in a tubular rack bar housing 2 formed as an extension of a pinion housing 3. Rotatably mounted in the housing 3 is a pinion 4, the teeth of which engage with a rack 5 on the rack bar 1. The rack 5 and pinion 4 may be regarded as conventional whereby the pinion is rotated in response to a steering input to impart longitudinal displacement to the rack bar 1.

The rack bar housing 2 has a longitudinally extending slot 6 within which are located pins 7 that engage with the rack bar to be longitudinally displaceable therewith and provide a centre take-off from the rack bar. The pins 7 engage with tie rods 8 from which a steering output is derived from the system. The part length of the housing 2 containing the slot 6 is enclosed within bellows 9 which flex during displacement of the pins 7 and maintain a sealed enclosure for the rack bar.

The rack bar 1 is supported by two longitudinally spaced bearings 10 and 11 through which it is longitudinally displaceable. These bearings are mounted in the pinion and rack bar housings to be restrained against longitudinal displacement and serve to support the rack bar against lateral displacement which may result from the reaction through the pins 7 during a steering manoeuvre or road shocks/vibration or from the reaction of the driving engagement between the pinion and the rack. More particularly, the bearing 10 is in the form of a yoke or saddle which straddles the rack bar on the side thereof remote from the position of engagement between the rack and pinion and oppositely to such position. This yoke or saddle is spring loaded to bias the rack 5 into engagement with the pinion 4. In the present example the major part length of the rack bar 1 has a cylindrical profile (other than for localised deformities, for example to facilitate connection of the pins 7) while a part length 12 of the rack bar which is co-extensive with the rack 5 has a substantially 'V' or 'Y' shaped lateral section with which the saddle or yoke 10 is in complementary sliding engagement. This latter arrangement is well known in the art and serves to restrain the rack bar against rolling about its longitudinal axis as a result of the reaction from the pins 7 and/or the reaction of the driving engagement between the rack and pinion. The bearing 11 conprises a cylindrical bush fitted in a complementary seating in the rack bar housing and having an annular seal 13 which effectively forms part of a piston and cylinder device 14.

The piston and cylinder device 14 is in longitudinal alignment with the rack bar 1 and has a cylinder housing 15 formed by a longitudinal extension of the rack bar housing 2. Longitudinally slidable within the cylinder 16 of the housing 15 is a piston 17 mounted on and secured to the end of the piston rod 1 which extends into the cylinder through the bush 11. Formed within the cylinder housing 15 and located on opposite sides of the piston 17 are piston chambers 18 and 19 which are partly defined by longitudinally opposed faces 20 and 21 respectively of the piston. As a consequence of the rack bar 1 extending from the piston 17 and through the piston chamber 18 it will be appreciated that the piston faces 20 and 21 have different effective pressurised areas when the chambers 18 and 19 are subjected to fluid pressure. In accordance with the present invention the effective pressurised area of the piston face 21 is arranged to be twice the effective pressureised area of the piston face 20.

The piston and cylinder device 14 is intended to provide power assistance to displacement of the rack bar 1 which is effected during rotation of the pinion 4 and fluid flow to the device 14 is determined by a valve assembly shown generally at 22. The valve assembly 22 may be of a rotary type such as that discussed in our G.B. Patent No. 2,075,932, and is incorporated in the rotary input to the pinion 4 so that it is responsive to the steering input and directs fluid to the piston chambers 18 and 19 for displacing the piston 17 in a direction consistent with the intended direction of displacement of the rack bar. In the typical arrangement illustrated the valve assembly 22 controls the flow of hydraulic fluid under pressure derived from a reservoir 23 and pump 24 to fluid lines 25 and 26 which communicate respectively with ports 27 and 28 of the respective piston chambers 18 and 19. It will be noted from the drawing that optional alternatives for the ports 27 and 28 are available as indicated at 27a and 28a respectively. The valve 22 has a fluid return or exhaust line 23a to the reservoir. The valve assembly is of the open centre/open return type and has a neutral condition to which it is resiliently biased and adopts when a steering input torque is not applied to the pinion 4 and in which condition hydraulic fluid from the pump 24 and also from the piston chambers 18 and 19 is open to communication with exhaust or reservoir through the fluid line 23a.

When an input torque is applied to the pinion 4 to effect a steering manoeuvre and to displace the rack bar in one sense of direction, say leftwardly in the drawing, the valve assembly 22 is arranged to direct fluid at substantially the same pressure by way of lines 25 and 26 into both piston chambers 18 and 19. As a consequence the piston 17 is subjected to a fluid pressure differential as a result of the different areas of the piston faces 20 and 21 which causes the piston to be displaced leftwardly in the drawing to assist in the movement of the rack bar 1. During this movement of the piston, the pressurised fluid which is displaced from the contracting chamber 18 may be transferred to the expanding chamber 19. During the application of a steering input torque to the pinion to displace the rack bar and effect a steering manoeuvre in the opposite sense, that is where the rack bar is displaced rightwardly in the drawing, the valve assembly 22 is arranged to direct fluid of the same pressure as that previously mentioned by way of line 25 into the piston chamber 18 and to open communication between the piston chamber 19 and exhaust or reservoir by way of the lines 26 and 23a. As a consequence of this latter fluid control and the difference in the effective pressurised areas of the piston faces 20 and 21, the piston 17 is subjected to substantially the same pressure differential as that previoulsy discussed but in the reverse sense so that the piston assists in the intended displacement of the rack bar rightwardly in the drawing. Neglecting any loading on the rack bar 1 it will be appreciated that the speed at which the rack bar will be displaced by operation of the piston and cylinder device will be substantially the same in both senses of direction.

As an optional feature, the piston chamber 19 can communicate with the piston chamber 18 through a non-return valve which permits such communication when the fluid pressure in the chamber 19 is greater than that in the chamber 18 but which closes communication when the pressure in chamber 18 is greater than that in the chamber 19. Such a non return valve can conveniently be located in the piston as indicated at 29 and may serve to increase the speed at which hydraulic fluid is displaced from the piston chamber 19 during its contraction by some of that fluid entering the expanding piston chamber 18.

The piston 17 may have an annular peripheral seal 30 which is slidable therewith and, in effect, can provide a sliding bearing for the rack bar to restrain the rack bar against lateral displacement.

I claim:

1. A rack and pinion power assisted steering system with a center take-off comprising:

a rack bar having a rack portion and another portion projecting from the rack portion and extending to an end of the rack bar, said another portion having a substantially uniform cross-section along its longitudinal extent, the cross-sectional area of said rack portion being less than or equal to the cross-sectional area of said another portion;

a pinion engaging said rack portion for effecting longitudinal displacement of said rack bar in first and second opposite directions in response to a steering input in one and another opposite directions, respectively;

a piston and cylinder assembly for providing power assist to the displacement of said rack bar and in longitudinal alignment with said rack bar, said piston and cylinder assembly having variable first and second fluid chambers, the piston of said piston and cylinder assembly being connected to said another porton of said rack bar for displacement therewith, said another portion of said rack bar extending through said first fluid chamber, said piston having opposite first and second faces defining in part said first and second fluid chambers, respectively, said second face having an area against which fluid pressure in said second fluid chamber acts twice as large as the area of said first face against which the fluid pressure in said first fluid chamber acts;

valve means for controlling fluid flow to said first and second fluid chambers in accordance with the steering input to actuate said piston and cylinder assembly, said valve means comprising means for communicating substantially the same fluid pressure to said first and second fluid chambers to effect contraction of said first fluid chamber under a pressure differential across said first and second faces to provide power assist to displacement of said rack bar in said first direction in response to a steering input in said one direction and means for communicating fluid pressure only to said first fluid chamber and for communicating said second fluid chamber to a reservoir to provide power assist to displacement of said rack bar in said second direction in response to a steering input in said another direction; and bearing means for supporting said rack bar for longitudinal displacement and for restraining said rack bar from lateral displacement, said bearing means comprising only two bearings spaced longitudinally from each other.

2. A system as claimed in claim 1 in which the rack bar is longitudinally displaceable in a rack bar housing and said cylinder comprises a longitudinal extension of said rack bar housing.

3. A system as claimed in claim 1 in which said another portion of the rack bar is of substantially constant cylindrical form.

4. A system as claimed in claim 1 in which one of said bearings comprises a bush located adjacent to the piston and cylinder device and through which the rack bar is longitudinally displaceable, said bush having sealing means to partly define the first piston chamber.

5. A system as claimed in claim 1 in which the second of said bearings comprises a support which slidably engages the rack bar on the side thereof remote from the rack teeth and acts to maintain the rack and pinion teeth in engagement.

6. A system as claimed in claim 5 in which the support co-operates with the rack bar to restrain the rack bar from rotating about a longitudinally extending axis thereof.

7. A system as claimed in claim 1 in which a non return valve is provided between the first and second fluid chambers, said valve being responsive to a fluid pressure differential between those chambers and reacting to open communication therebetween when the fluid pressure in the second fluid chamber exceeds that in the first piston chamber and to close communication therebetween when the fluid pressure in the first fluid chamber exceeds that in the second fluid chamber.

* * * * *